(12) United States Patent
Staudenrausch

(10) Patent No.: US 6,626,643 B2
(45) Date of Patent: Sep. 30, 2003

(54) TWIN VANE PUMP APPARATUS FOR DISPENSING MEAT PRODUCTS

(75) Inventor: Georg Staudenrausch, Biberach (DE)

(73) Assignee: Handtmann Piereder Machinery Ltd., Ontario (CA)

( * ) Notice: Subject to any disclaimer, the term of this patent is extended or adjusted under 35 U.S.C. 154(b) by 0 days.

(21) Appl. No.: 09/994,413

(22) Filed: Nov. 27, 2001

(65) Prior Publication Data

US 2003/0099547 A1 May 29, 2003

(30) Foreign Application Priority Data

Oct. 10, 2001 (CA) ............................................. 2358587

(51) Int. Cl.⁷ ............................................... F04B 49/00
(52) U.S. Cl. ........................... 417/28; 417/297; 418/33; 418/35; 99/472; 99/476
(58) Field of Search .................. 417/297, 28, 328; 418/33, 35; 99/472, 476

(56) References Cited

U.S. PATENT DOCUMENTS

| | | | |
|---|---|---|---|
| 7,751 A | 11/1850 | Davis | |
| 27,196 A | 2/1860 | Hitchcock | |
| 36,232 A | 8/1862 | Perry | |
| 1,133,030 A | 3/1915 | Hottmann | ............ 17/37 |
| 3,631,565 A | 1/1972 | Muller | ............ 17/37 |
| 4,032,049 A * | 6/1977 | Roberts | ............ 452/44 |
| 4,060,349 A | 11/1977 | Piereder | |
| 4,188,767 A | 2/1980 | Piereder | ............ 53/122 |
| 4,417,434 A | 11/1983 | Piereder | ............ 53/469 |
| 4,484,374 A | 11/1984 | Herschberger | |
| 5,129,316 A * | 7/1992 | Calderon | ............ 99/472 |
| 5,154,663 A | 10/1992 | Righele | ............ 452/41 |
| 5,429,085 A * | 7/1995 | Stauffer | ............ 123/245 |
| 5,720,603 A | 2/1998 | Miller et al. | |
| 6,158,987 A * | 12/2000 | Raikamo | ............ 418/36 |
| 6,321,693 B1 * | 11/2001 | Kim et al. | ............ 123/18 R |
| 6,422,831 B1 * | 7/2002 | Ito et al. | ............ 417/269 |

FOREIGN PATENT DOCUMENTS

| | | |
|---|---|---|
| GB | 702 107 A | 1/1954 |
| JP | 59101592 | 12/1984 |

* cited by examiner

Primary Examiner—Charles G. Freay
Assistant Examiner—Emmanuel Sayoc
(74) Attorney, Agent, or Firm—Caesar, Rivise, Bernstein, Cohen & Pokotilow, Ltd.

(57) ABSTRACT

An apparatus and method for producing predetermined quantities of a meat product, inc which the apparatus comprises a twin vane concentric pump with an inlet and an outlet circumferentially spaced from one another, and a pair of independently movable vanes. During operation, one of the vanes is positioned between the inlet and outlet to permit pressurization of meat chunks in a chamber communicating with an outlet opening. The other vane is advanced toward the outlet with the outlet valve closed until a predetermined pressure is reached, at which point the outlet valve is opened to dispense a predetermined quantity of meat product. Similar to single vane meat pumps, the disclosed twin vane pump is capable of handling large meat chunks while causing relatively little damage to the chunks. However, the disclosed twin vane pump provides greater operating efficiency than single vane pumps and also achieves greater pressurization of the meat product than prior art pumps, permitting the meat product to be directly transferred to a stuffing horn without the need for further pressurization.

16 Claims, 7 Drawing Sheets

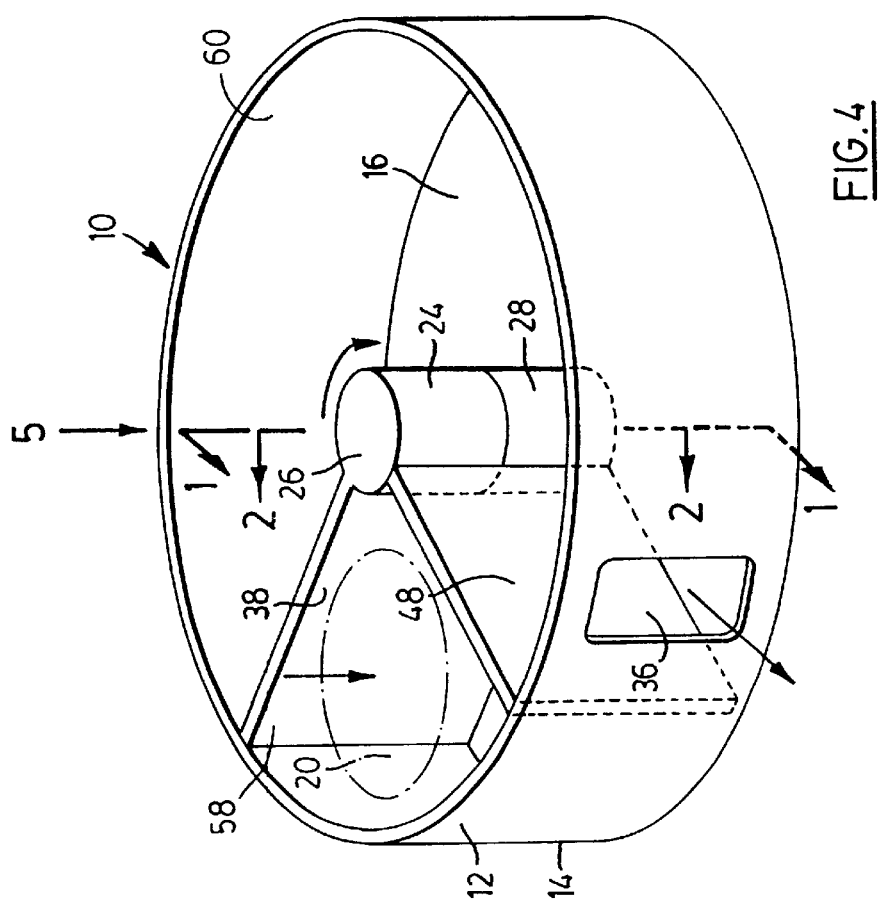
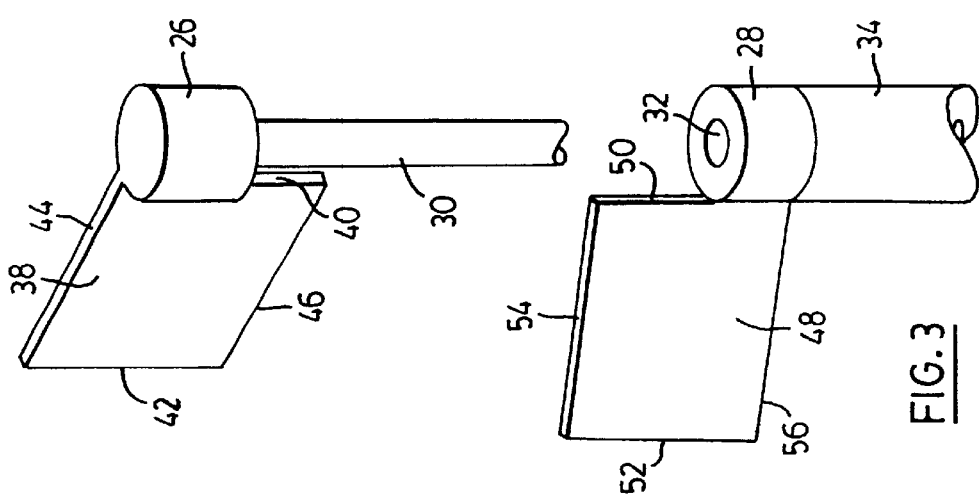
FIG. 4
FIG. 3

TWIN VANE PUMP APPARATUS FOR DISPENSING MEAT PRODUCTS

FIELD OF THE INVENTION

This invention relates to a pump for transferring and portioning pieces of meat, meat emulsions or any viscous material from a feed means such as a hopper to a packaging means.

BACKGROUND OF THE INVENTION

In the production of whole muscle meat products, such as hams, large meat chunks are transferred from a hopper to a packaging station by way of a meat pump. At the packaging station, the meat is divided into portions and stuffed into casings.

One type of meat pump for transferring large pieces of meat from a hopper to a packaging station is described in U.S. Pat. No. 4,060,349 to Piereder A and comprises a continuous flow, oscillating meat pump in which a single vane oscillates between a pair of walls defining a V-shaped chamber. The pump described in this patent is advantageous in the production of whole muscle meat products since it can handle large pieces of meat and causes relatively little damage to the meat chunks, in comparison with other types of pumps which use screws or gears to transport the meat.

However, single vane oscillating pumps have the disadvantage that the vane must stop and change direction at the end of its path, resulting in a loss of efficiency which limits the output of the pump.

A further disadvantage of many presently used meat pumps is that they operate at relatively low pressures. Thus, when the meat product is expelled from the pump outlet, it must be further pressurized prior to being portioned and stuffed into a casing in order to ensure that it is uniform and free of voids. The pressurization, portioning and stuffing operations are typically performed by a single apparatus which is positioned at the outlet of the meat pump. Examples of presently used portioning and packaging devices are described in U.S. Pat. Nos. 4,188,767 and 4,417,434, both to Piereder.

In order to improve efficiency in the production of whole muscle meat products, it would be advantageous to provide a meat pump which is provides greater output than presently used single vane oscillating meat pumps and which is able to pressurize and portion the meat product to thereby perform at least some of the operations which would otherwise be performed by a separate portioning apparatus.

SUMMARY OF THE INVENTION

The present invention overcomes the disadvantages of the prior art discussed above by providing an improved method and apparatus for continuously pumping meat chunks from a feed means to a packaging station in which the meat product is pressurized as it is being pumped and is accurately divided into portions of predetermined size at an outlet valve, thereby eliminating the need for a separate portioning device.

The apparatus according to the invention comprises a twin vane concentric pump in which two movable vanes are rotatable in the same direction. At least one vane is rotating at all times, and therefore losses in efficiency due to stoppage and change of direction of the vanes are substantially reduced or eliminated.

Pressurization of the meat product is achieved by having one vane remain stationary between the inlet and outlet while rotating the second vane toward the outlet, thereby pressurizing the meat product and expelling it through the outlet.

The apparatus also comprises a control system which monitors the pressure and volume within the meat pump and controls the operation of the outlet valve to ensure that the meat product is pressurized to a predetermined pressure and that the portion size is accurately controlled.

In one aspect, the present invention provides an apparatus for dispensing predetermined amounts of a meat product, comprising: (a) a pump housing having an inlet opening, an outlet opening and a hollow interior, with a pump axis being centrally located in said hollow interior and surrounded by a side wall of said housing; (b) first and second vane means located in said hollow interior and rotatable about said pump axis, each of said vane means having a proximal edge proximate the pump axis and a distal edge proximate the side wall of the pump, said vane means dividing said hollow interior into a pair of chambers which are substantially sealed from one another, said chambers each having a volume which varies with relative rotation of the vane means; (c) drive means for rotating said first and second vane means independently of one another; (d) valve means associated with said outlet opening for opening and closing said outlet opening; (e) pressure sensing means for sensing a pressure in at least one of said chambers; (f) volume determination means for measuring a volume in at least one of said chambers; and (g) control means for controlling rotation of said vane means and operation of said valve means in response to pressure and volume information generated by said pressure sensing means and said volume determination means.

In a preferred aspect of the invention, the volume determination means measures the volume of at least one of the chambers by determining the relative positions of the vane means. Preferably, the pressure sensing means senses the pressure inside the outlet chamber, and the volume determination means determines the volume of the outlet chamber. In a further preferred aspect, the apparatus further comprises a stuffing horn associated with the valve means to receive said predetermined amounts of meat product from the valve means. In yet another preferred aspect of the invention, the predetermined amounts of meat product are severed from one another by closing the valve means. In yet another preferred aspect of the invention, the vane means are connected to drive shafts driven by separate drive means. In yet another preferred aspect of the invention, the drive means comprise servo drives. In yet another preferred aspect of the invention, the drive shafts comprise a first drive shaft for driving the first vane means and a second drive shaft for driving the second vane means, the drive shafts being coaxial with the second drive shaft being hollow and having a cylindrical bore through which the first drive shaft extends.

In another aspect, the present invention provides a method for producing predetermined quantities of a meat product using an apparatus comprising a pump housing having an inlet opening, an outlet opening and a hollow interior, with a pump axis being centrally located in said hollow interior and surrounded by a side wall of said housing; and first and second vane means located in said hollow interior and rotatable about said pump axis, each of said vane means having a proximal edge proximate the pump axis and a distal edge proximate the side wall of the pump, said vane means dividing said hollow interior into a pair of chambers which are substantially sealed from one another, said chambers each having a volume which varies with relative rotation of the vane means; said method comprising: (a) positioning said first vane means between said inlet and outlet openings and positioning said second vane means such that a first chamber of said pair of chambers communicates only with said inlet opening and a second chamber of said pair of chambers communicates only with said outlet opening; (b) with the valve means closed, moving the second vane means while the first vane means remains stationary, the second vane means being moved by rotation about said pump axis in a direction such that the volume of the second chamber is decreased and such that a pressure within said second chamber increases to a predetermined pressure and such that the volume of the first chamber is increased and said meat product enters said inlet opening; (c) with the pressure in the second chamber at the predetermined pressure, calculating the volume of the second chamber and, where the volume is less than said predetermined amount of the meat product, proceeding to step (g) or, where the volume is greater than said predetermined amount of the meat product, proceeding to step (d); (d) opening the valve means to allow the meat product to exit the second chamber, while continuing said rotation of said second vane means to maintain said predetermined pressure; (e) closing said valve means once the predetermined amount of the meat product has been dispensed from the outlet opening; (f) repeating steps (c) to (e) until the volume measured in step (c) is less than the predetermined amount of the meat product; (g) rotating the first and second vane means in the same direction until the second vane means is positioned between said inlet and outlet openings and the first vane means is positioned such that the first chamber is in communication only with the outlet opening and the second chamber is in communication only with the inlet opening.

In a preferred method of the present invention, the predetermined pressure is up to about 35 bar. In yet another preferred aspect of the present invention, in which the apparatus further comprises a stuffing horn, the method further includes passing the predetermined quantities of meat product through the stuffing horn into a casing.

BRIEF DESCRIPTION OF THE DRAWINGS

Preferred embodiments of the invention will now be described, by way of example only with reference to the accompanying drawings, in which:

FIG. 3 illustrates the two vanes of the pump shown in FIG. 1 in isolation, and separated from one another;

FIG. 4 is a perspective view taken from the top and the outlet side of the housing of the pump shown in FIG. 1, with the cover removed and the position of the inlet opening being indicated in dashed lines;

DETAILED DESCRIPTION OF PREFERRED EMBODIMENTS

Figure 1:
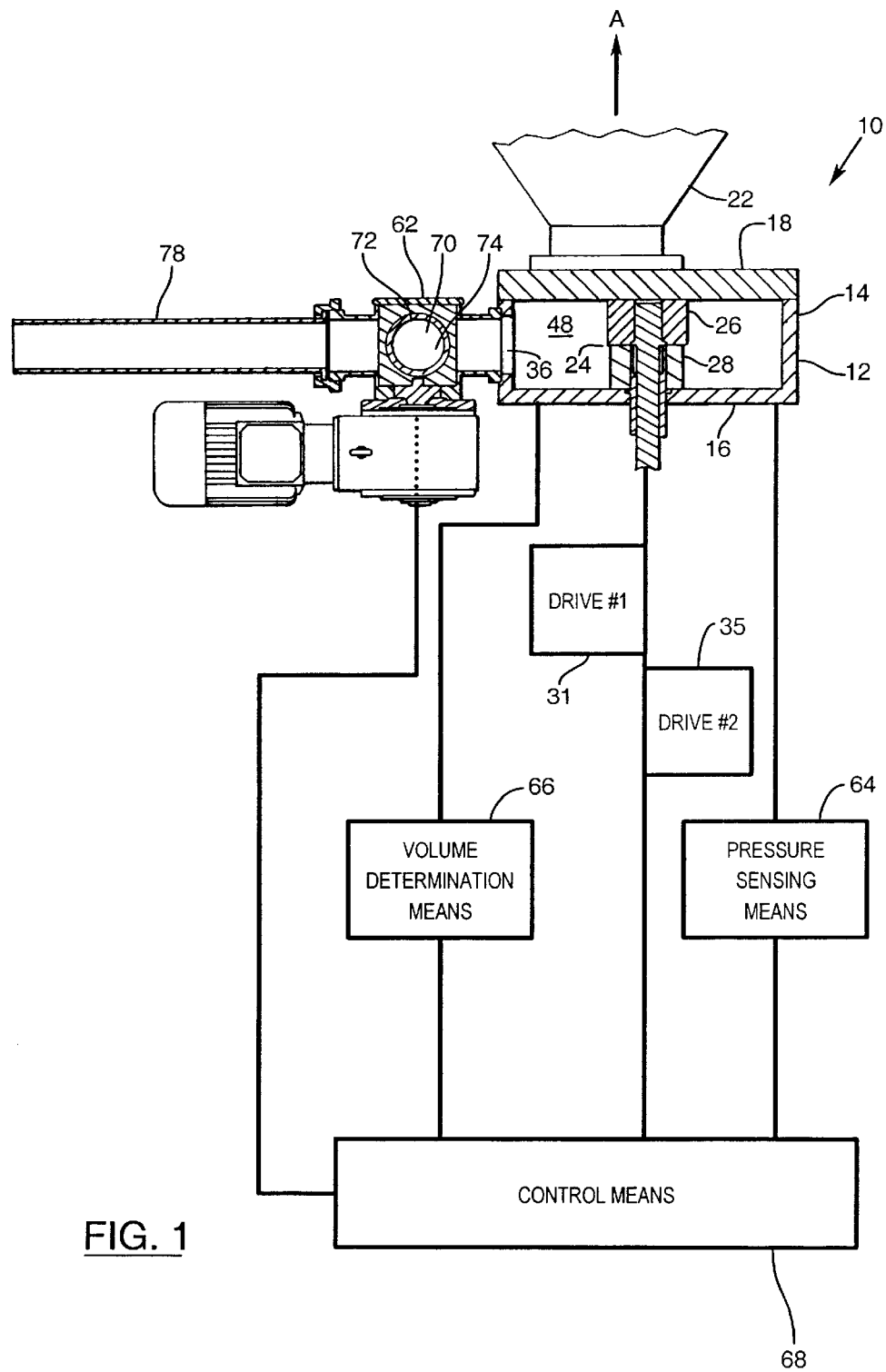
FIG. 1 is a cross-sectional side elevation view of a preferred twin vane concentric pump according to the present invention, the cross-section being in plane 1—1 shown in FIG. 4 which passes through the outlet opening of the pump.
Figure 2:
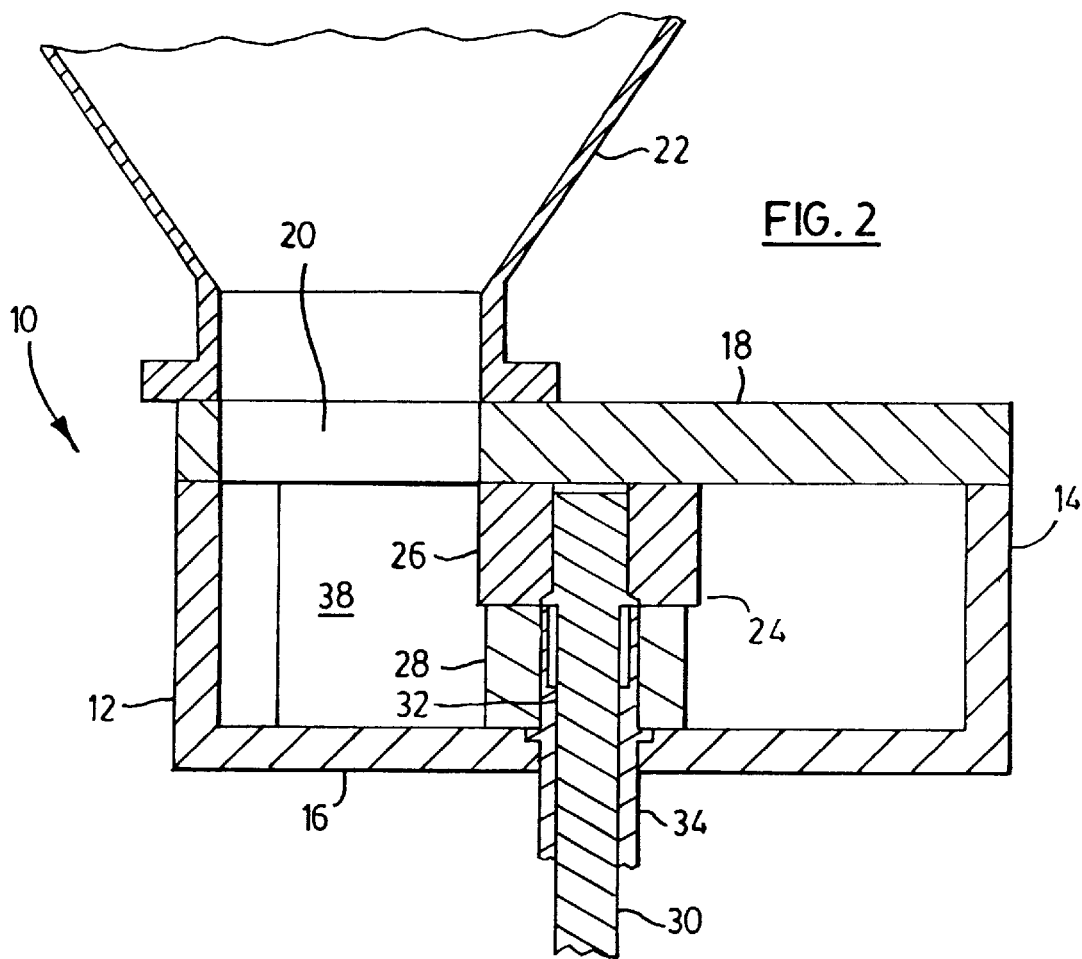
FIG. 2 is a cross-sectional side view of the hopper and housing of the pump shown in FIG. 1, taken in plane 2—2 shown in FIG. 4 which passes through the pump inlet.

A preferred apparatus for transferring and portioning meat chunks is illustrated in the cross-sectional side views of FIGS. 1 and 2. The preferred apparatus includes a twin vane concentric meat pump 10 having a cylindrical housing 12 comprised of a cylindrical side wall 14, a circular, flat bottom wall 16 and removable cover 18. The side wall 14, bottom wall 16 and cover 18 of the pump housing 12 together define a hollow interior space having a substantially cylindrical shape.

The removable cover 18 is provided with an inlet opening 20 (FIG. 2) which is in communication with a hopper 22 through which meat chunks are fed into the hollow interior of the pump 10. The inlet opening 20 is provided proximate an edge of the cover 20.

The side wall 12 of housing 14 is provided with an outlet opening 36 (FIG. 1) through which the meat product is expelled from the pump 10. As illustrated in FIG. 2, the inlet opening 20 is spaced circumferentially from the outlet opening 36 such that the inlet opening 20 is not located directly above the outlet opening 36, for reasons which will become apparent below.

Located within the hollow interior space of pump housing 12 is a cylindrical hub 24 which extends along a pump axis A. The hub 24 is comprised of two portions, a cylindrical upper portion 26 and a cylindrical lower portion 28. The outside diameters of the upper and lower portions are preferably the same.

The upper portion 26 of hub 24 is mounted on a drive shaft 30 which passes through a hollow passage 32 in the lower portion 28 of hub 24. The lower portion 28 of hub 24 is connected to a hollow drive shaft 34 through which the shaft 30 extends. Drive shafts 30 and 34 are driveable by separate driving means 31 and 35, only schematically illustrated in FIG. 1. Preferably, the driving means 31, 35 each comprise a servo drive and are contained in a gearbox.

Attached to the upper portion 26 of hub 24 is a first vane 38 (see FIGS. 2, 3 and 4) having a proximal edge 40 extending parallel to the pump axis and a distal edge 42 extending parallel to the pump axis and being proximate the side wall 14 of housing 12 so as to form a substantial seal therewith. The upper portion of the proximal edge 40 is connected to the upper portion 26 of hub 24, while the lower portion of proximal edge 40 is closely spaced relative to the lower portion 28 of hub 24 so as to form a substantial seal therewith. The first vane 38 has a height which is substantially the same as the height of the hollow interior space of the housing 12 such that the upper edge 44 of vane 38 forms a substantial seal with the cover 18 and the lower edge 46 of vane 38 forms a substantial seal with the bottom wall 16 of the housing 12.

Attached to the lower portion 28 of hub 24 is a second vane 48 (see FIGS. 1, 3 and 4) having a proximal edge 50, a distal edge 52, an upper edge 54 and a lower edge 56. Second vane 48 has dimensions substantially identical to those of the first vane 38 to thereby form a substantial seal with the bottom wall, cover and side wall of housing 12. The proximal edge 48 of the second vane 48 has a lower portion which is attached to the lower portion 28 of hub 24, and an upper portion which is closely spaced relative to upper portion 26 of hub 24 so as to form a substantial seal therewith.

As shown in FIG. 4, the vanes 38 and 48 divide the hollow interior of housing 12 into a pair of chambers which are substantially sealed from one another. With the second vane 48 positioned between the circumferentially spaced inlet opening 20 and outlet opening 36 as shown in FIG. 4, the pair of chambers comprises an inlet chamber 58 which communicates only with the inlet opening 20 and an outlet chamber 60 which communicates only with the outlet opening 36. As will become apparent from the discussion below, the relative volumes of the inlet and outlet chambers 58 and 60 are variable with relative rotation of the first and second vanes 38 and 48.

Located externally of the housing 12 at the outlet opening 36 is an outlet valve 62 (FIG. 1) which may preferably have a valve body with a spherical or cylindrical valve chamber 70. Inside valve chamber 70 is provided a rotatable valve element 72 having a circular cross-section as shown in FIG. 1 and having a cylindrical bore 74 through which the meat product is expelled. The valve 62 is shown in the open position in FIG. 1, and can be closed by rotating valve element by 90 degrees. As illustrated, the outlet valve is preferably in direct communication with a tubular stuffing horn 78, such that the portioned meat product (not shown) is directly stuffed into a casing (not shown) as it leaves outlet valve 62.

The apparatus 10 further comprises pressure sensing means 64 (FIG. 1) to sense the pressure within the outlet chamber 60, and volume determination means 66 (FIG. 1) to monitor the volume of the outlet chamber 60. Preferably, these means continuously monitor the pressure and volume inside the outlet chamber during pump operation. The pressure and volume data gathered by the pressure sensing and volume determination means are communicated to a control means 68 (FIG. 1) which controls the opening and closing of outlet valve 62 based on the supplied pressure and volume data.

The operation of pump 10 according to the invention will now be described below with reference to FIGS. 5 to 9, which illustrate the positions of vanes 38 and 48 during a first cycle of pump operation. In the example described below, the maximum volume of the outlet chamber is greater than two times, and less than three times, the volume of the portioned meat product which is produced by apparatus 10. However, it will be appreciated that the preferred apparatus 10 is capable of producing portioned meat products of a variety of predetermined sizes. Preferably, housing 12 is sufficiently large that the maximum volume of the outlet chamber 60 will be greater than the volume of the portioned meat product which is to be produced.

Figure 5:
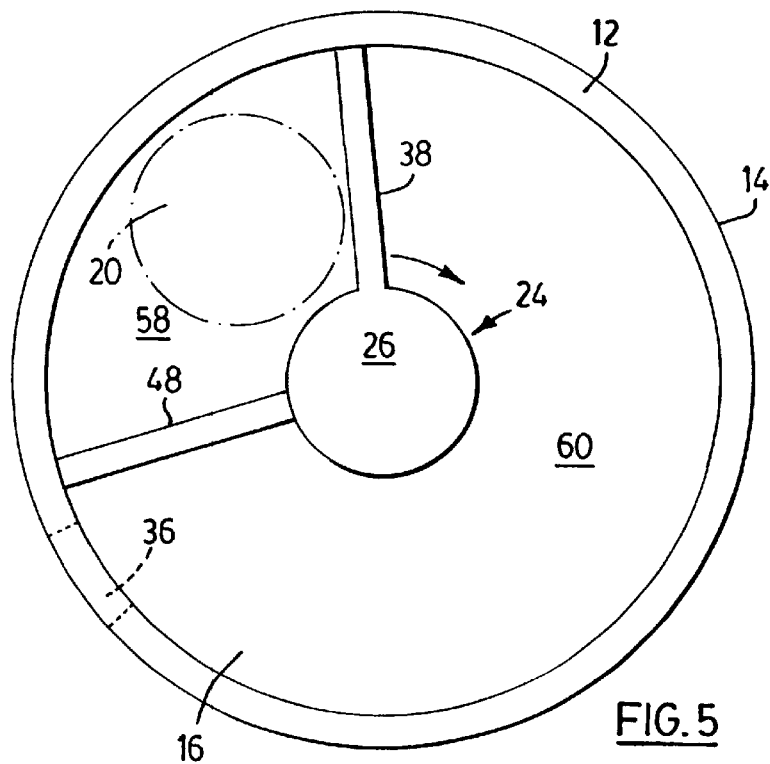
FIGS. 5 to 9 are top plan views of the pump housing of FIG. 1 showing the positions of the vanes during various stages of operation.

FIG. 5 illustrates the relative positions of the vanes 38 and 48 at the beginning of a first pumping cycle during operation of the pump 10, and is essentially the same configuration described above in connection with FIG. 4. That is, the second vane 48 is positioned between the inlet opening 20 and outlet opening 36 and the first vane 38 is positioned just ahead of the inlet opening 20. Thus, inlet chamber 58 and outlet chamber 60 are formed, and are substantially sealed from one another by the vanes 38 and 48. At the beginning of the cycle, the outlet valve 62 is closed, thereby preventing the pump from expelling the meat product through outlet opening 36 until it has been sufficiently pressurized.

During the first portion of this pump cycle, first vane 38 is rotated in the clockwise direction (toward the outlet opening 36) about the pump axis A, while the second vane 48 remains stationary between the inlet and outlet openings 20 and 36. Thus, during rotation of the first vane 38, the volume of inlet chamber 58 increases while the volume of outlet chamber 60 decreases. Therefore, a vacuum is created in the inlet chamber, allowing meat chunks to enter the inlet chamber 58 from the hopper 22. Simultaneously, the contents of the outlet chamber 60 are pressurized.

Figure 6:
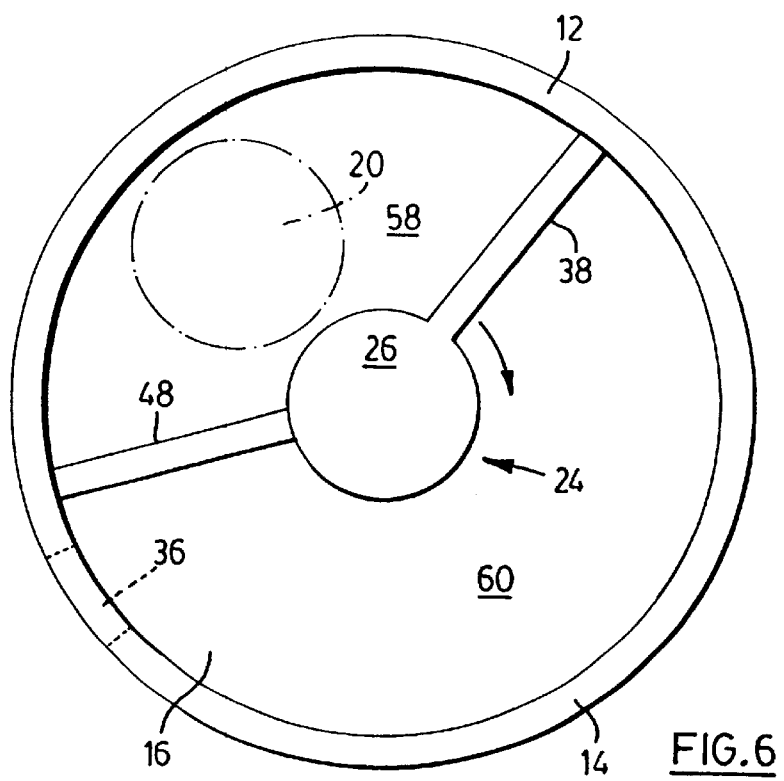

As the first vane 38 is rotated toward the outlet opening 36, with the outlet valve 62 closed, the pressure and volume inside the outlet chamber 60 are monitored by pressure sensing means 64 and volume determination means 66. Rotation of first vane 38 continues until the meat product in the outlet chamber 60 has been pressurized to a predetermined pressure, which is preferably up to about 35 bar. FIG. 6 illustrates the relative positions of the vanes 38 and 48 at the instant that the pressure in the outlet chamber 60 reaches the predetermined pressure. If the volume of the outlet chamber 60 at this point is greater than the predetermined amount of the meat product to be expelled from the pump, the valve 62 is opened to allow the meat product to be expelled. Preferably, the meat product is directly stuffed into a casing as it is expelled from the outlet valve 62.

With the outlet valve 62 open, rotation of the first vane 38 is continued in order to maintain the pressure in the outlet chamber 60 substantially equal to the predetermined pressure.

As the meat product is expelled from the outlet chamber 60, the volume inside the outlet chamber 60 is monitored by volume determination means 66. Once the volume inside the outlet chamber 60 is reduced by an amount equal to the predetermined amount, the outlet valve 62 is again closed, thereby separating the dispensed portion of meat from that remaining inside the apparatus 10. As mentioned above, the casing is preferably stapled shut and is cut to sever the encased portion of meat from the apparatus 10.

Figure 7:
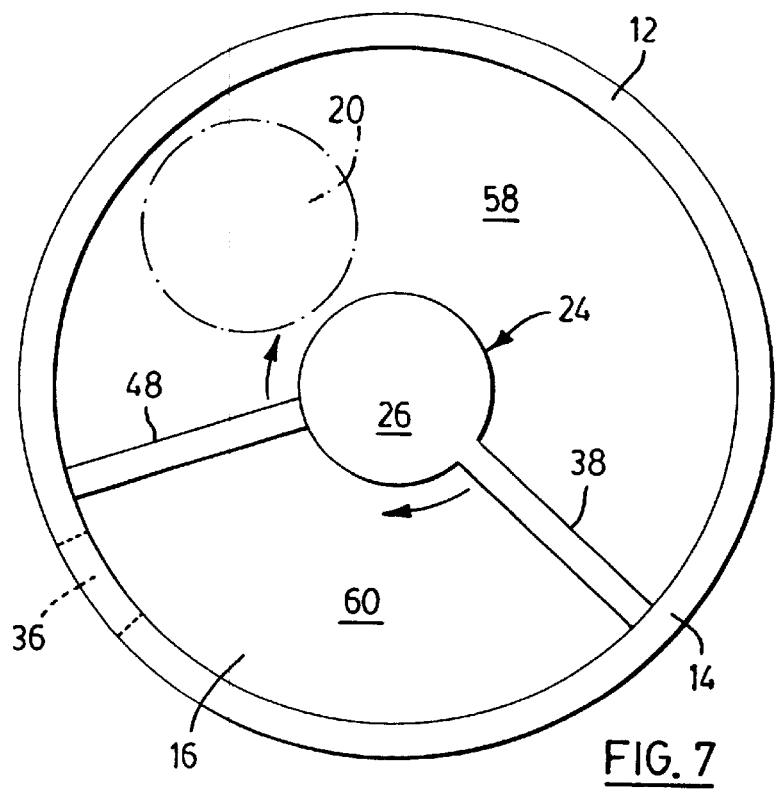

FIG. 7 illustrates the relative positions of the vanes 38 and 48 at the instant that the valve 62 is closed to sever the first portion of meat product from that remaining inside the apparatus 10. With the pressure inside outlet chamber 60 maintained at the predetermined pressure, the volume of the outlet chamber is again determined by the volume determination means. In this example, the remaining volume of the outlet chamber 60 as shown in FIG. 7 greater than the predetermined volume of the portioned meat product, and therefore the valve 62 is again opened to expel a second portion of meat product.

As the meat is expelled through the valve 62, the first vane 38 is further advanced to maintain the predetermined pressure in the outlet chamber 60. After the predetermined amount of the meat product is expelled from the pump, the outlet valve 62 is again closed, at which point the vanes 38 and 48 have the relative positions shown in FIG. 8.

Figure 8:
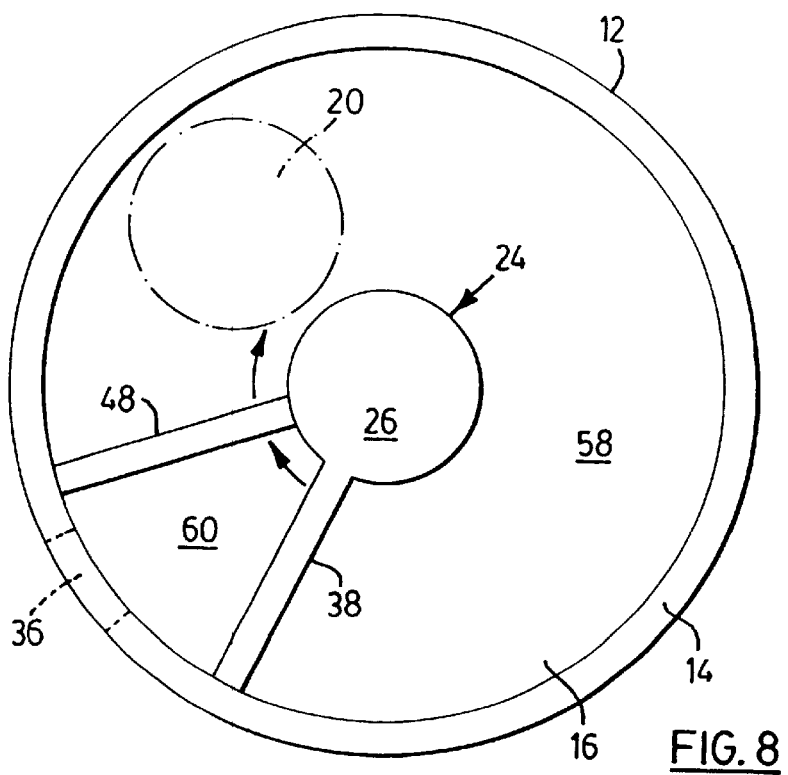
Figure 9:
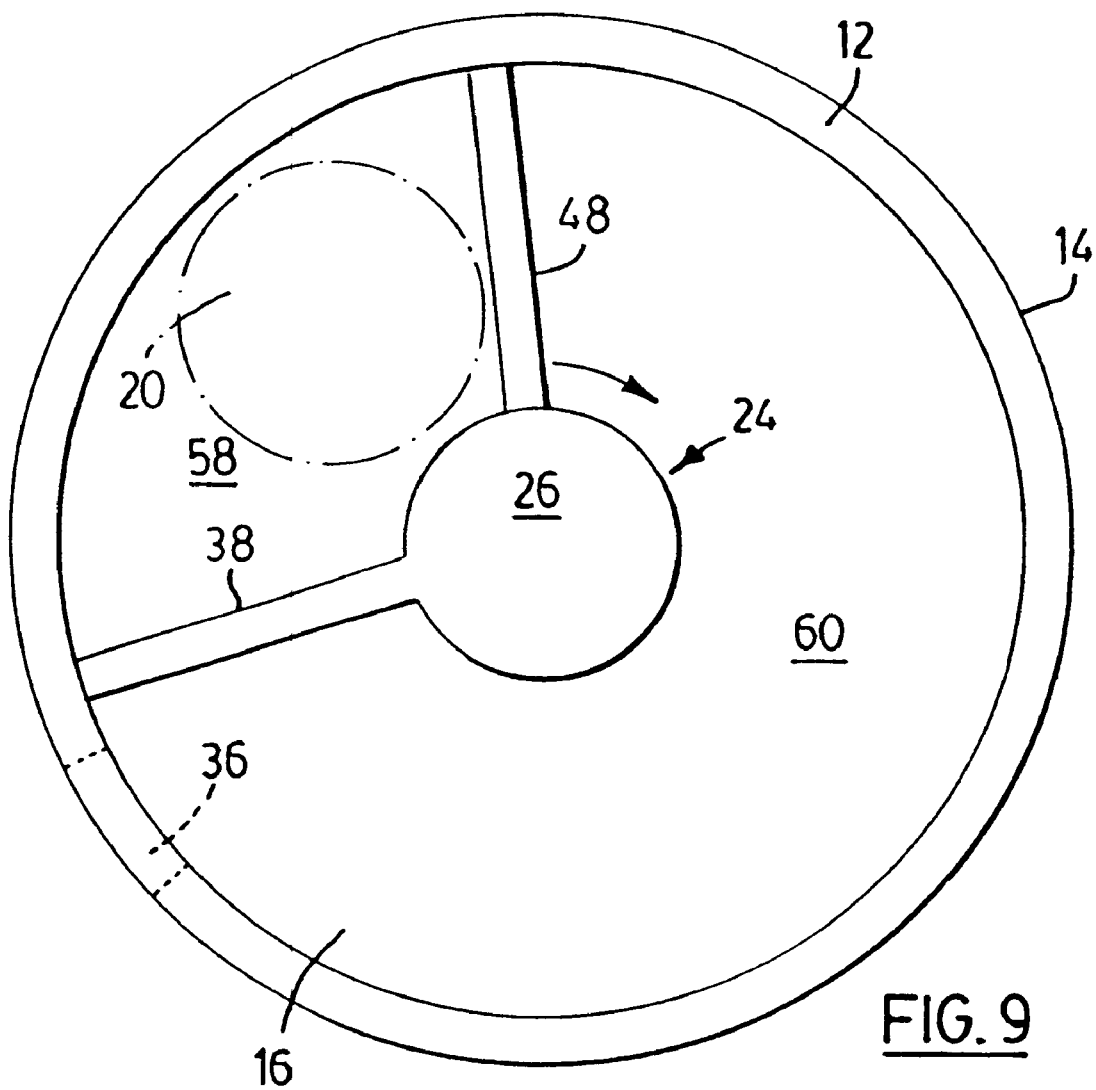

Again, with the pressure within outlet chamber 60 maintained at the predetermined pressure, the volume of the outlet chamber 60 is determined. In the configuration of FIG. 8, the remaining volume of outlet chamber 60 is less than the predetermined amount of the meat product, and therefore the amount of meat product remaining in outlet chamber 60 is insufficient to produce another portioned meat product. Accordingly, at this point, both the first vane 38 and the second vane 48 are advanced in the clockwise direction until they adopt the configuration shown in FIG. 9, in which the first vane is now positioned between the inlet opening 20 and the outlet opening 36, and in which the second vane is positioned ahead of the inlet opening 20. The vanes are thus positioned for a second cycle of operation in which the second vane 48 is rotated clockwise while the first vane 38 is held stationary. The second cycle of operation is otherwise identical to the first cycle of operation.

Figure 10:
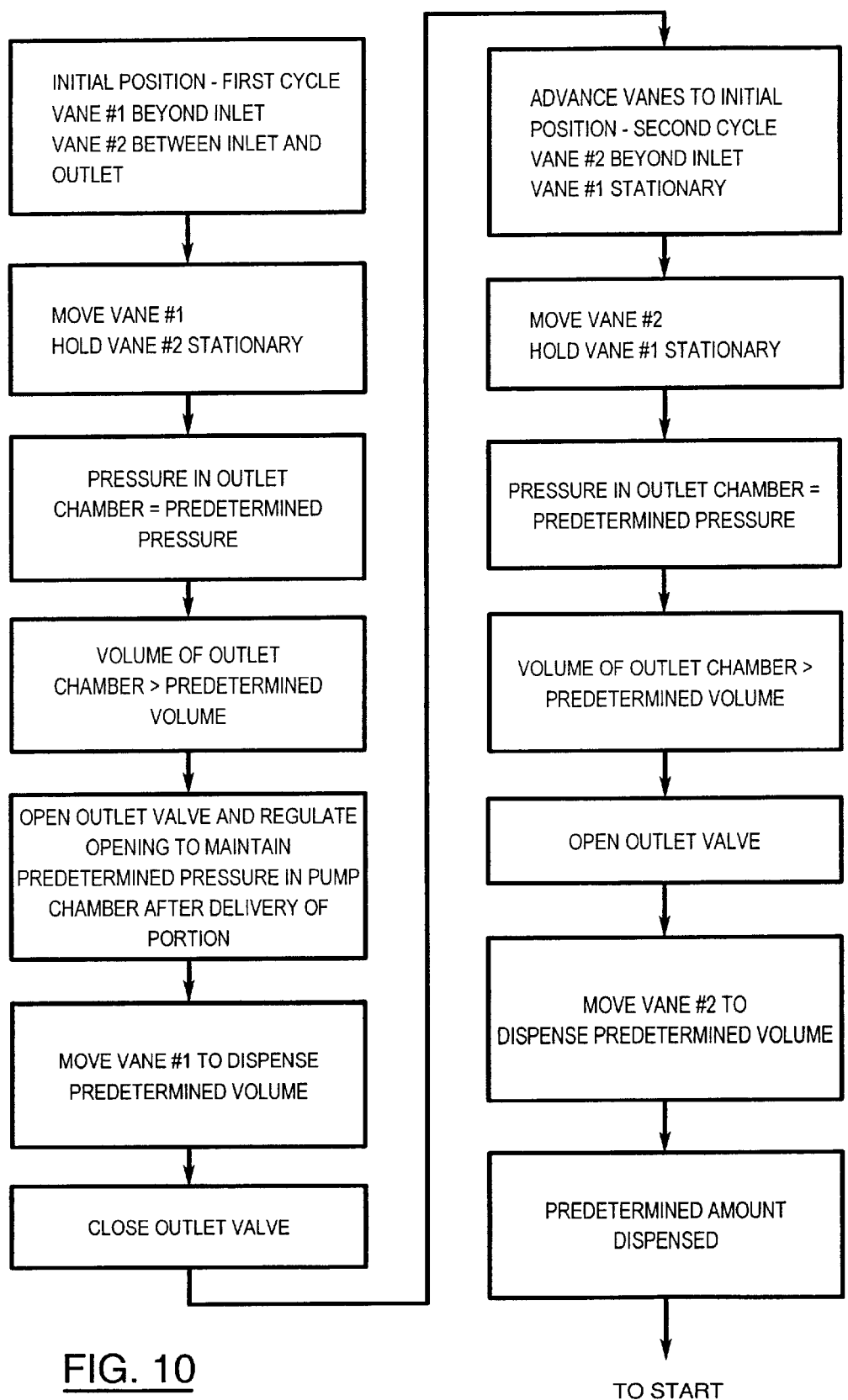
FIG. 10 is a flow chart illustrating the steps in the preferred method according to the present invention.

The steps to be followed during two complete cycles of pump operation are shown in the flow chart of FIG. 10.

In the above-described example, the operation of the pump 10 was described after initial pump start-up, in which the outlet chamber 60 is full of meat chunks at the start of each cycle. It will be appreciated that, upon initial start-up of the pump 10, the outlet chamber 60 will be empty, and therefore the outlet valve 62 is not opened during the first cycle of operation.

During pump operation, the first and second cycles are repeated in the manner described above to continuously expel predetermined volumes of the meat product from the pump 10. The pressurization of the outlet chamber 60 with the valve closed permits effective pressurization of the meat product therein, thereby eliminating the need for further pressurization of the meat product after it is expelled from the pump.

Furthermore, rotation of both vanes 38 and 48 in the same direction, in combination with simultaneous rotation of the vanes 38 and 48 by independent driving means at the end of each cycle, improves pump efficiency by avoiding loss of momentum due to stopping and changing the direction of rotation at the end of each cycle.

In addition, the use of pressure and volume sensing means, and the use of a control means to control operation of the outlet valve, permits the production of accurately controlled portions of the meat product which eliminates the need for a separate portioning apparatus.

Although the invention has been described in connection with certain preferred embodiments, it is not intended to be limited thereto. Rather, the invention includes all embodiments which may fall within the scope of the following claims.

What is claimed is:

1. An apparatus for dispensing predetermined amounts of a meat product, comprising:
   (a) a pump housing having an inlet opening, an outlet opening and a hollow interior, with a pump axis being centrally located in said hollow interior and surrounded by a side wall of said housing;
   (b) first and second vanes located in said hollow interior and rotatable about said pump axis, each of said vanes having a proximal edge proximate the pump axis and a distal edge proximate the side wall of the pump, said vanes dividing said hollow interior into a pair of chambers which are substantially sealed from one another, said chambers each having a volume which varies with relative rotation of the vanes;
   (c) drive means for rotating said first and second vanes independently of one another;
   (d) valve means associated with said outlet opening for opening and closing said outlet opening;
   (e) pressure sensing means for sensing a pressure in at least one of said chambers;
   (f) volume determination means for measuring a volume in at least one of said chambers;
   (g) control means for controlling rotation of said vanes and operation of said valve means in response to pressure and volume information generated by said pressure sensing means and said volume determination means; and
   (h) a stuffing horn associated with the valve means to receive said predetermined amounts of meat product from the valve means.

2. The apparatus of claim 1, wherein the volume determination means measures the volume of at least one of the chambers by determining the relative positions of the vanes.

3. The apparatus of claim 1, wherein the pressure sensing means senses the pressure inside the outlet chamber.

4. The apparatus of claim 1, wherein the volume determination means determines the volume of the outlet chamber.

5. The apparatus of claim 1, wherein the predetermined amounts of meat product are severed from one another by closing the valve means.

6. The apparatus of claim 1, wherein the vanes are connected to drive shafts driven by separate drive means.

7. The apparatus of claim 6, wherein said drive means comprise servo drives.

8. The apparatus of claim 6, wherein said drive shafts comprise a first drive shaft for driving the first vane and a second drive shaft for driving the second vane, the drive shafts being coaxial with the second drive shaft being hollow and having a cylindrical bore through which the first drive shaft extends.

9. An apparatus for dispensing predetermined amounts of a meat product, comprising:
   (a) a pump housing having an inlet opening, an outlet opening and a hollow interior, with a pump axis being centrally located in said hollow interior and surrounded by a side wall of said housing;
   (b) first and second vanes located in said hollow interior and rotatable about said pump axis, each of said vanes having a proximal edge proximate the pump axis and a distal edge proximate the side wall of the pump, said vanes dividing said hollow interior into a pair of chambers which are substantially sealed from one another, said chambers each having a volume which varies with relative rotation of the vanes;
   (c) drive means for rotating said first and second vanes independently of one another;
   (d) valve means associated with said outlet opening for opening and closing said outlet opening;
   (e) pressure sensing means for sensing a pressure in at least one of said chambers;
   (f) volume determination means for measuring a volume in at least one of said chambers; and
   (g) control means for controlling rotation of said vanes and operation of said valve means in response to pressure and volume information generated by said pressure sensing means and said volume determination means;
      wherein the predetermined amounts of meat product are severed from one another by closing the valve means.

10. The apparatus of claim 9, wherein the volume determination means measures the volume of at least one of the chambers by determining the relative positions of the vanes.

11. The apparatus of claim 9, wherein the pressure sensing means senses the pressure inside the outlet chamber.

12. The apparatus of claim 9, wherein the volume determination means determines the volume of the outlet chamber.

13. The apparatus of claim 9, further comprising a stuffing horn associated with the valve means to receive said predetermined amounts of meat product from the valve means.

14. The apparatus of claim 9, wherein the vanes are connected to drive shafts driven by separate drive means.

15. The apparatus of claim 14, wherein said drive means comprise servo drives.

16. The apparatus of claim 14, wherein said drive shafts comprise a first drive shaft for driving the first vane and a second drive shaft for driving the second vane, the drive shafts being coaxial with the second drive shaft being hollow and having a cylindrical bore through which the first drive shaft extends.

* * * * *